United States Patent
Grossenbacher et al.

(10) Patent No.: US 6,191,502 B1
(45) Date of Patent: Feb. 20, 2001

(54) APPARATUS FOR TAPPING CURRENT FROM A BUSBAR

(75) Inventors: Erich Grossenbacher, Derendingen; Christoph Rüetschi, Bern, both of (CH)

(73) Assignee: Montech AG (CH)

( * ) Notice: Under 35 U.S.C. 154(b), the term of this patent shall be extended for 0 days.

(21) Appl. No.: 09/376,926

(22) Filed: Aug. 18, 1999

(30) Foreign Application Priority Data

Aug. 21, 1998 (DE) .............................. 198 37 975

(51) Int. Cl.$^7$ ...................................... H02J 3/00
(52) U.S. Cl. ................. 307/69; 191/63; 104/93
(58) Field of Search .................. 307/69, 145; 191/63, 191/57, 58, 63.1, 49; 104/93

(56) References Cited

U.S. PATENT DOCUMENTS

| | | | | |
|---|---|---|---|---|
| 1,443,873 | * | 1/1923 | Donham | 191/63 |
| 1,570,933 | * | 1/1926 | Bennington | 191/63 |
| 1,572,946 | * | 2/1926 | Owens et al. | 191/63 |
| 1,821,425 | * | 8/1931 | Coseo | 191/63 |

* cited by examiner

Primary Examiner—Fritz Fleming
Assistant Examiner—Robert L. DeBeradinis
(74) Attorney, Agent, or Firm—Bachman & LaPointe, P.C.

(57) ABSTRACT

In an apparatus for tapping current from a busbar by means of a roller which is arranged, for example, on a trolley, the one roller is also intended to have associated with it at least one further roller, adjacent to it and at a distance from the same busbar. In addition, at least one further busbar is provided parallel to said busbar on which further rollers for tapping current roll. In addition, each roller is assigned a connection to an electrical load and a contact spring leads from the connection to the roller circumference and makes contact at the roller circumference.

11 Claims, 1 Drawing Sheet

APPARATUS FOR TAPPING CURRENT FROM A BUSBAR

BACKGROUND OF THE INVENTION

The invention relates to an apparatus for tapping current from a busbar by means of at least one roller which is arranged, for example, on a trolley.

Normally, current is tapped from busbars using, for example, apparatuses which move in respect to the busbar. These include, in particular, trolleys which are guided along rails, on which the busbars are normally also located. Trolleys are known and are commercially available in widely differing forms and configurations. The trolleys which are referred to in the present exemplary embodiment relate primarily to the transportation of workpieces, material or the like between processing stations in which processing activities are carried out on the workpiece. Such systems are nowadays used, for example, in the electronics industry, in order to fit components to printed circuits or the like. However, it is only by way of example and, according to the invention, apparatuses for tapping current from a busbar may be used in many industrial fields.

One example, in which an apparatus according to the invention for tapping current from a busbar is described, is disclosed in EP-A-0 728 647. The claim there covers the provision of a roller which is composed of electrically conductive material and rolls on the busbar being provided for tapping current.

In practice, it has been found to be disadvantageous that short voltage interruptions occur per busbar when tapping current using a roller, due to expansion joints, dirt or offsets, which then lead to malfunctions, for example on electronically controlled trolleys.

In order to ensure correct operation of electronic components, no voltage interruption may occur below, for example, 5 V (TTL signals) or 12 V (CMOS) etc.

SUMMARY OF THE INVENTION

The present invention is based on the object of overcoming this disadvantage and of avoiding voltage interruptions.

In order to achieve this object, the one roller also has associated with it at least one further roller, adjacent to it and at a distance from the same busbar.

Where one of the two rollers arrives at a expansion joint, an offset or a dirty region, then any possible voltage interruption is prevented by the second roller, thus ensuring a continuous power supply, for example to an electronic controller.

The present invention relates in particular to current transfers from busbars for current collectors for electrically powered vehicles with electronic traction current control. Expansion joints are in this case required because the structure which supports the busbar is composed of a different material than the busbar itself. Lengthy structures which cannot resist expansion would lead to the electrical conductors being damaged by temperature differences.

Joints other than expansion joints also occur where so-called switches are installed in a straight piece of rail.

BRIEF DESCRIPTION OF THE DRAWINGS

Further advantages, features and details of the invention result from the following description of preferred exemplary embodiments and with reference to the drawings, in which.

DETAILED DESCRIPTION OF PREFERRED EMBODIMENTS

Figure 1:
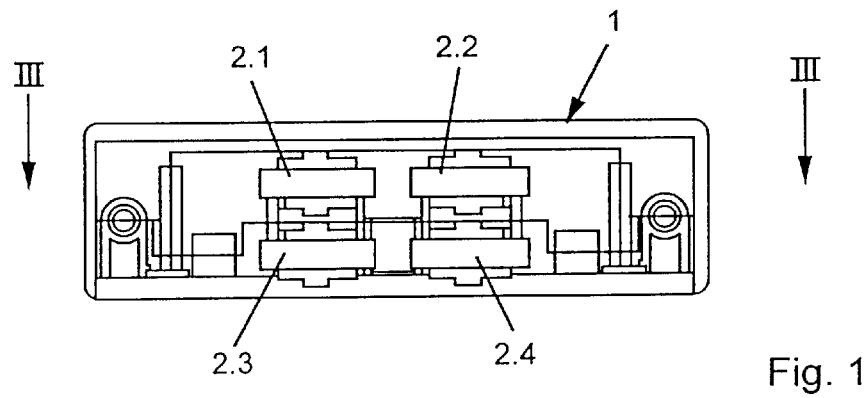
FIG. 1 shows a side view of an apparatus according to the invention for tapping current.

Current interruptions are caused in particular by non-electrically conductive particles on the busbar itself, or an offset in the busbar over which an individual roller jumps.

All these factors, which can lead to brief current interruptions, are eliminated by the present invention. It is evident from corresponding measurement diagrams that the voltage constancy is considerably better when using two current collector rollers than with one. The probability of current interruptions occurring simultaneously on both rollers is extraordinarily low.

In order to allow one trolley to be operated in normal conditions, at least two busbars must be provided, one busbar being in the form of a neutral conductor, and the other busbar being in the form of a positive pole. In this case, each busbar preferably has at least two rollers associated with it in each case, which tap the current.

The current is transmitted from the rollers, which rotate in operation, to the electrical connecting of the load by means of sliding contacts (leaf springs).

The roller holes contain plastic bushes, which prevent current from being transferred from the rollers to the bearing bolts.

Each roller is attached by its bearing bolt to the fork-shaped end of in each case one slide, which can move backward or forward at right angles to the corresponding busbar. A helical spring is arranged at the other end of the slide, and ensures that the rollers are prestressed with a specific force against the busbars associated with them.

The external contours of the slides themselves slide in in each case one guide channel, or else at the same time on each case in one guide rod which is located approximately in the center of each slide. The guide channels are in this case used, in particular, to prevent the slides from rotating.

In order to prevent the helical springs causing the slides to slide out of the guide channels or off the guide rods, opposing bearings are provided, which delimit the vertical movement.

When moving through a so-called switch, where the rail on which the trolleys run has a partially circular shape and where, in consequence, the busbars also have a circular shape, this distance between the current collector and the busbars changes. This difference in distance is compensated for by the slide structure described above which ensures that a good current supply to the trolleys is always maintained even when moving over rail sections which are not straight.

The current collector structure described above in which, in a preferred exemplary embodiment, the rollers are composed of a metal-carbon mixture, furthermore has the advantage that the wear in use is extremely low, thus also allowing it to be used in a clean room.

The low wear is achieved by minimizing the friction, in particular on those parts which transmit current.

When the current collector roller is rolling on the busbar, all that occurs is the rolling friction which, as is known, is very low. However, this is achieved only provided the drive torque of the roller is considerably greater than the moment which brakes the roller. In the present case, the drive torque of the current collector roller is equal to the product of the static-friction coefficient (between the current collector roller and the busbar), the contact-pressure force of the roller on the busbar, and the radius of the roller. The braking torque of the roller is equal to the product of the sliding-friction coefficient (between the bearing bolt and the bearing ring), the contact-pressure force of the current collector roller on the busbar and the radius of the bearing bolt, plus the product of the sliding-friction coefficient between the current collector roller and the contact spring, of the contact-pressure force of the contact spring on the external diameter of the current collector roller and the radius of the current collector roller.

With the chosen dimensioning of the diameter of the current collector rollers and their bearing bolts, as well as the contact-pressure forces of the helical spring and of the contact spring, the drive torque of the current collector rollers is several times greater than the braking torque, thus leading to the life of the current transmitting elements also being correspondingly long.

Figure 2:
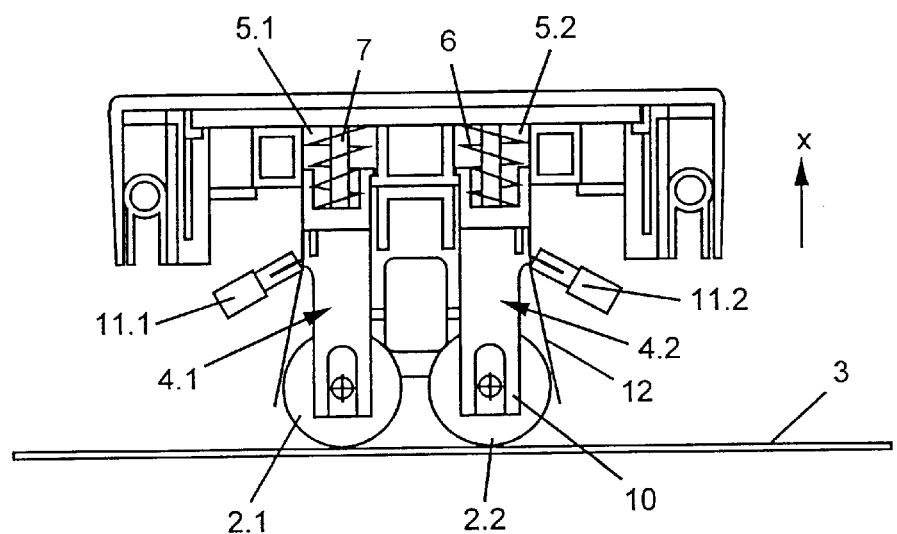
FIG. 2 shows a plan view of the opened apparatus as shown in FIG. 1.

An apparatus according to the invention for tapping current has, as shown in FIG. 1, a housing 1 in which four rollers 2.1 to 2.4 are arranged such that they can rotate. In the in-use position, these rollers 2.1 to 2.4 each have associated pairs of busbars 3, although only one busbar 3 is shown in FIG. 2. While the rollers 2.1 and 2.2 are intended for a busbar in the form of a positive pole, the rollers 2.3 and 2.4 roll on a busbar which is a neutral conductor.

Each roller 2.1 to 2.4 is located on a slide 4.1 to 4.4, which is arranged in a guide channel 5.1 to 5.4 such that it can slide. The items 4.3 and 4.4 as well as 5.3. and 5.4 are not shown in the drawing. The slides 4.1 to 4.4 move in the direction of the arrow x.

Figure 3:
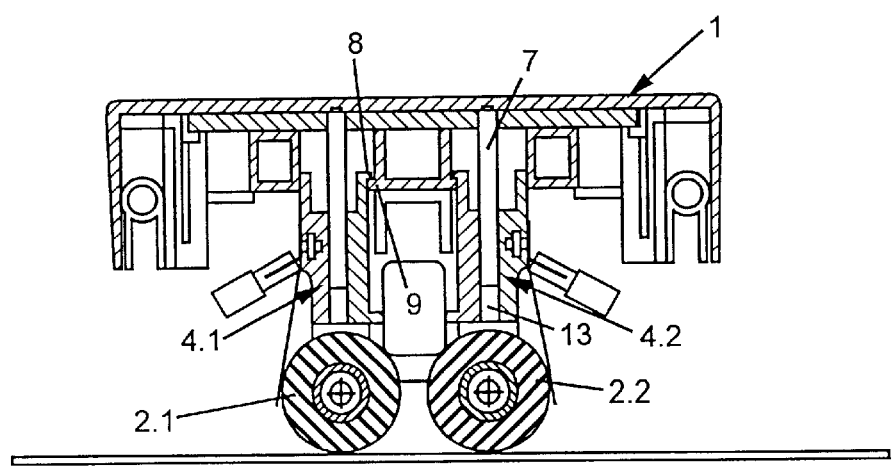
FIG. 3 shows a cross section through the apparatus as shown in FIG. 1, along the line III—III.

In the guide channel 5.1 to 5.4, the slide 4.1 to 4.4 is subject to the pressure from a helical spring 6, which engages around a guide rod 7 that is fixed to the housing 1. This guide rod 7 engages in a longitudinal hole 13 (see FIG. 3) in the slide 4.1 to 4.4, with the slide 4.1 to 4.4 being guided on this guide rod 7.

To prevent the slide 4.1 to 4.4 from being able to slide out of the guide channel 5.1 to 5.4, opposing bearings 8 are provided on the slides 4.1 to 4.4, and engage behind corresponding latching strips 9.

The current is transmitted from the busbar 3 to the rollers 2.1 and 2.2, and from a further busbar to the rollers 2.3 and 2.4. Each of the two rollers 2.1 and 2.2 as well as 2.3 and 2.4 are electrically connected to one another. There is a contact spring 12 on the circumference of each roller. These are attached to the slides 4.1 to 4.4 at the sides and each have a connection 11.1 to 11.4 (items 11.3 and 11.4 are not shown in the drawing).

The method of operation of the present invention is as follows:

An apparatus according to the invention for tapping current from a busbar may, for example, have an associated trolley as is described in EP-A-0 728 647. In this case, the rollers 2.1 to 2.4 rest against the busbar, in pairs, at a distance from one another along the busbars, and each roll in pairs on a busbar 3.

When the rollers 2.1 to 2.4 reach the area of an expansion joint, then the current tapping from that roller which is running over the expansion joint may be briefly interrupted. However, this has no effect on the current collector since, at that time, the second roller is still completely in contact with the busbar 3, and is running on it. The same is true as well in the event of other possible disturbances, for example in the event of a offset in the busbar or in the case of a dirty area.

What is claimed is:

1. An apparatus which comprises: one busbar and at least one roller for tapping current from said busbar; at least one further roller associated with said at least one roller and adjacent thereto and at a distance from said one busbar; at least one further busbar provided parallel to said one busbar on which said further roller rolls for tapping current; wherein each roller is assigned a connection to an electrical load and wherein a contact spring leads from said connection to the roller circumference and makes contact at the roller circumference.

2. The apparatus according to claim 1, wherein said at least one roller comprises two rollers.

3. The apparatus according to claim 2, wherein said further roller comprises two rollers.

4. The apparatus according to claim 1, wherein said rollers are arranged on a trolley.

5. The apparatus according to claim 1, wherein said connection is an electric motor.

6. The apparatus according to claim 1, wherein said rollers can be moved from said busbars against the force of a helical spring.

7. The apparatus according to claim 6, wherein said rollers are mounted such that they can rotate on a slide which is supported in a guide channel against the force of a helical spring.

8. The apparatus according to claim 7, wherein the slide has a longitudinal hole via which it is guided on a guide rod.

9. The apparatus according to claim 7, wherein in the guide channel, the slide has an opposing bearing operative to hold the slide in the guide channel.

10. The apparatus according to claim 1, wherein said rollers are composed of a metal-carbon mixture.

11. An apparatus which comprises: one busbar and at least one roller for tapping current from said busbar; at least one further roller associated with said at least one roller and adjacent thereto and at a distance from said one busbar; at least one further busbar provided parallel to said one busbar on which said further roller rolls for tapping current; wherein each roller is assigned a connection to an electrical load and wherein a contact spring leads from said connection to the roller circumference and makes contact at the roller circumference, and wherein said rollers can be moved away from said busbars against the force of a helical spring, wherein said rollers are mounted such that they can rotate on a slide which is supported in a guide channel against the force of a helical spring, and wherein a fork having tines is provided on the slide and holds said rollers between said tines such that the rollers are mounted to rotate.

* * * * *